(12) United States Patent
Egerer et al.

(10) Patent No.: US 10,011,060 B2
(45) Date of Patent: Jul. 3, 2018

(54) METHOD FOR PRODUCING A SHAPED PART, AND SUCH A SHAPED PART

(71) Applicant: NOVEM Car Interior Design GmbH, Vorbach (DE)

(72) Inventors: Gerhard Egerer, Trabitz (DE); Martin Kreutzer, Creussen (DE); Daniel Hoth, Eckersdorf (DE)

(73) Assignee: Novem Car Interior Design GMbH, Vorbach (DE)

( * ) Notice: Subject to any disclaimer, the term of this patent is extended or adjusted under 35 U.S.C. 154(b) by 163 days.

(21) Appl. No.: 14/902,835

(22) PCT Filed: Jul. 14, 2014

(86) PCT No.: PCT/EP2014/065047
§ 371 (c)(1),
(2) Date: Jan. 4, 2016

(87) PCT Pub. No.: WO2015/007687
PCT Pub. Date: Jan. 22, 2015

(65) Prior Publication Data
US 2016/0193763 A1 Jul. 7, 2016

(30) Foreign Application Priority Data
Jul. 15, 2013 (DE) .................. 10 2013 107 459

(51) Int. Cl.
*B32B 3/26* (2006.01)
*B29C 45/14* (2006.01)
(Continued)

(52) U.S. Cl.
CPC .. *B29C 45/14508* (2013.01); *B29C 45/14475* (2013.01); *B29C 45/1418* (2013.01);
(Continued)

(58) Field of Classification Search
CPC ................................. B29C 45/14508
(Continued)

(56) References Cited

U.S. PATENT DOCUMENTS

| 5,672,397 A | 9/1997 | Bowers |
| 2009/0226676 A1 | 9/2009 | Smith |
| 2010/0104828 A1 | 4/2010 | Engel |

FOREIGN PATENT DOCUMENTS

| DE | 102005029610 | 1/2007 |
| DE | 102010008263 | 8/2011 |

(Continued)

*Primary Examiner* — Brent T O'Hern
(74) *Attorney, Agent, or Firm* — Workman Nydegger

(57) ABSTRACT

A shaped part comprises a decorative layer on a shaped-part front side, which is configured as the visible face, and a carrier on a shaped-part reverse side. The shaped-part front side is subdivided into at least two regions, a first region and a second region. The decorative layer comprises a first decorative material and a second decorative material, each having a front side and a reverse side. In the first region, the front side the first decorative material provides part of the visible face, and in the second region, the front side of the second decorative material provides part of the visible face. The method comprises preshaping the first and second decorative materials, placing the preshaped decorative materials into an opened cavity of an injection mold, closing the cavity, and configuring the carrier by injecting plastics material into the cavity.

6 Claims, 2 Drawing Sheets

(51) Int. Cl.
*B29K 705/00* (2006.01)
*B29L 31/30* (2006.01)

(52) U.S. Cl.
CPC ............... *B29C 2045/14237* (2013.01); *B29C 2045/14245* (2013.01); *B29C 2045/14483* (2013.01); *B29K 2705/00* (2013.01); *B29K 2995/0097* (2013.01); *B29L 2031/3041* (2013.01)

(58) Field of Classification Search
USPC .......................................................... 428/61
See application file for complete search history.

(56) References Cited

FOREIGN PATENT DOCUMENTS

| | | | |
|---|---|---|---|
| DE | 102010030911 | 1/2012 | |
| DE | 102010044598 | 1/2012 | |
| DE | 102011012789 | 9/2012 | |
| DE | 102011012789 A1 * | 9/2012 | ............... B32B 3/12 |
| EP | 2295293 | 3/2011 | |
| EP | 2556940 | 2/2013 | |
| JP | 10138281 A * | 5/1998 | ....... B29C 45/14508 |
| JP | H10138281 | 5/1998 | |

\* cited by examiner

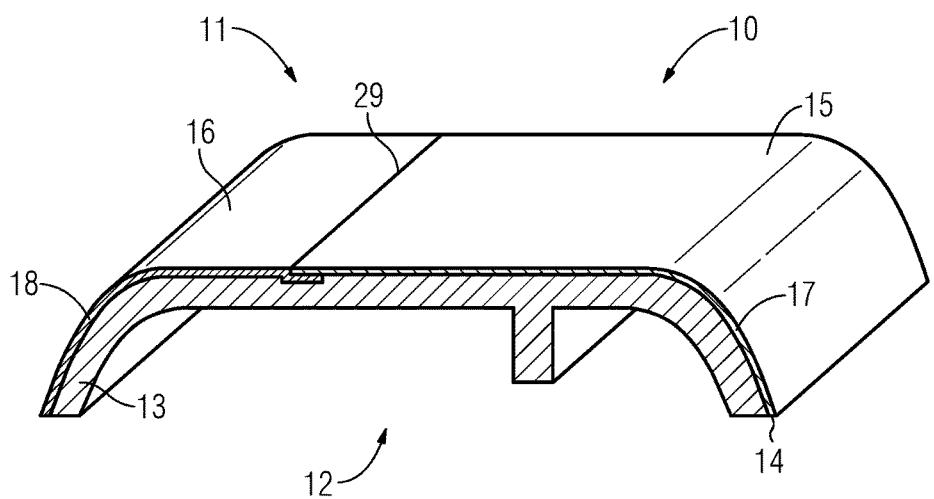

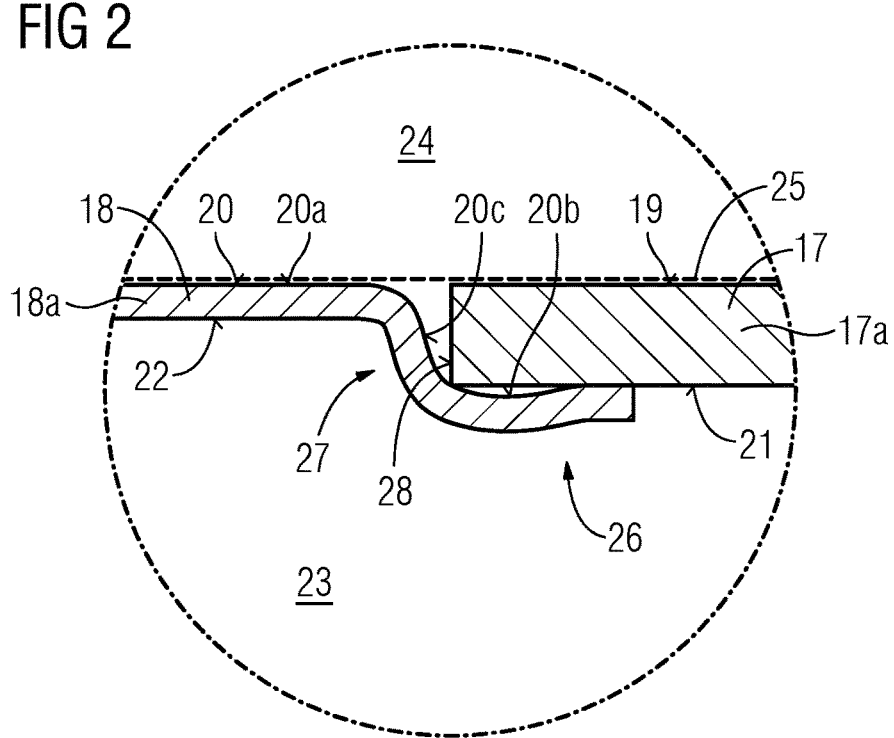
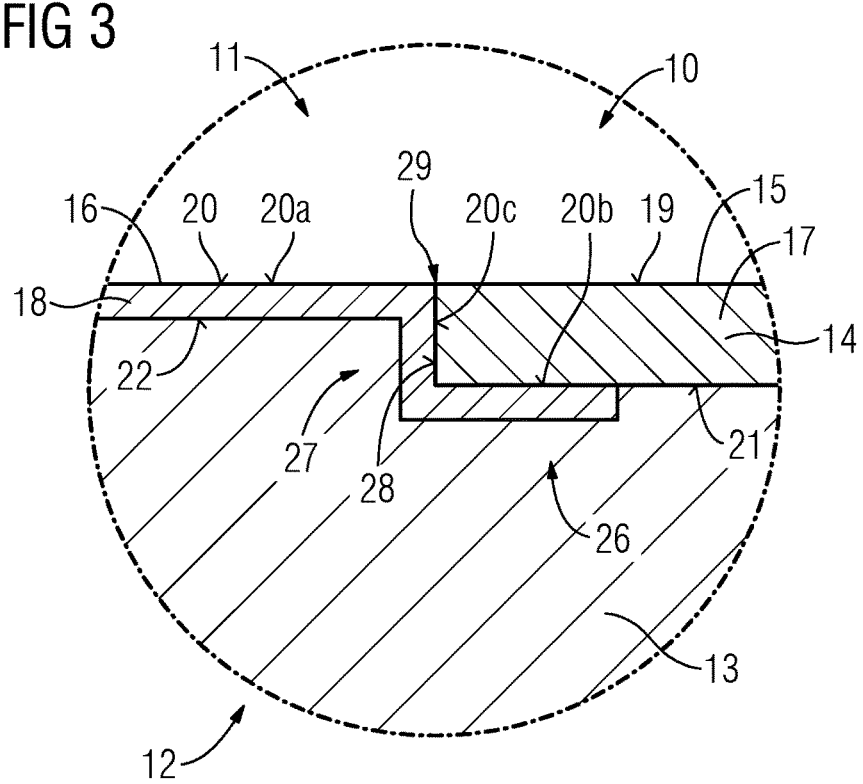

METHOD FOR PRODUCING A SHAPED PART, AND SUCH A SHAPED PART

CROSS-REFERENCE TO RELATED APPLICATIONS

The present invention is a 35 U.S.C. § 371 U.S. National Stage Application corresponding to PCT Application No. PCT/EP2014/065047, filed on Jul. 14, 2014, which claims priority to German Patent Application No. DE 10 2013 107 459.6, filed Jul. 15, 2013. The entire content of each of the aforementioned patent applications is incorporated herein by reference.

BACKGROUND OF THE INVENTION

1. Field of the Invention

The invention relates to a method for producing a shaped part, and to such a shaped part. The shaped part is in particular a decorative part and/or a trim part for a vehicle interior, which are/is configured as a shaped part.

2. Background

Numerous decorative parts and trim parts, which are configured as shaped parts, for example door trim parts, console and dash claddings, for example, are installed in the vehicle interior. Switchgear, or the cover of switchgear, respectively, also constitute decorative parts and trim parts.

These shaped parts comprise a decorative layer on a shaped-part front side which is configured as the visible face, and a carrier on a shaped-part reverse side, which is preferably disposed so as to be opposite the shaped-part front side.

The invention refers to shaped parts in which the shaped-part front side which is configured as the visible face is subdivided into at least two regions, a first region and a second region which is adjacent to the first region. The decorative layer comprises a first decorative material and a second decorative material, wherein in the first region of the visible face the first decorative material configures the visible face, and in the second region of the visible face the second decorative material configures the visible face.

Shaped parts of this type are typically produced by placing the two decorative materials side-by-side into an opened cavity of an injection mold and subsequently configuring the carrier by injecting plastics material into the cavity, wherein the decorative materials placed therein are back-injection molded. The shaped part which is formed in this way on the shaped-part front side thereof which is configured as the visible face has the two decorative materials disposed beside one another, wherein the first and the second decorative materials on the shaped-part front side are mutually spaced apart.

This spacing and the associated joint between the two decorative materials are not only undesirable for visual and haptic reasons but also have technical disadvantages. In this way, the shaped-part front side in this region of mutually adjacent decorative materials is non-planar and thus under circumstances has to be smoothed, for example by applying a lacquer layer. The spacing or the joint, respectively, may also act as a dirt trap, such that the region of mutually adjacent decorative materials becomes unsightly as time goes by and the shaped part therefore has to be replaced.

BRIEF SUMMARY OF THE INVENTION

The present invention is based on the object of stating a new method for producing shaped parts and a new shaped part, in particular a method and a shaped part which at least in part overcome the disadvantages mentioned above.

This object in terms of the method is achieved by the features of claim 1, and in terms of the shaped part by the features of claim 7. Advantageous design embodiments and refinements are stated in the dependent claims.

The method according to the invention is a method for producing a shaped part, in particular a decorative part and/or a trim part for a vehicle interior, which are/is configured as a shaped part. In particular, the shaped part may be the shaped part according to the invention which is described in the following.

This shaped part to be produced comprises a decorative layer on a shaped-part front side thereof, which is configured as the visible face, and a carrier on a shaped-part reverse side. The shaped-part front side which is configured as the visible face is subdivided into at least two regions, a first region and a second region which is adjacent to the first region. The decorative layer comprises a first decorative material and a second decorative material. In the first region of the shaped-part front side the first decorative material configures the visible face, and in the second region of the shaped-part front side the second decorative material configures the visible face.

The method according to the invention comprises the following steps:

a) preshaping the first decorative material into a first decorative shell and the second decorative material into a second decorative shell, wherein the first decorative shell and the second decorative shell each have a front side for configuring the visible face of the shaped part and a reverse side;

b) placing the first decorative shell into an opened cavity of an injection mold in such a manner that the front side of the first decorative shell at least partially lays against a wall of the cavity;

c) placing the second decorative shell in the opened cavity of the injection mold in such a manner, c1) that a first part of the front side of the second decorative shell at least partially lays against the wall of the cavity, c2) that a second part of the front side of the second decorative shell in an overlap region at least partially lays against the reverse side of the first decorative shell; and c3) that a third part of the front side of the second decorative shell in a transition region at least partially spans a lateral bounding area of the first decorative shell which interconnects the front side and the reverse side of the first decorative shell;

d) closing the cavity;

e) configuring the carrier by injecting plastics material into the cavity, e1) wherein the injected plastics material urges the front side of the first decorative shell and the first part of the front side of the second decorative shell against the wall, e2) wherein the injected plastics material in the overlap region urges the second part of the front side of the second decorative shell against the reverse side of the first decorative shell; and e3) wherein the injected plastics material in the transition region urges the third part of the front side of the second decorative shell against the lateral bounding area of the first decorative shell.

The method step of "preshaping" comprises the two-dimensional shaping and/or the three-dimensional shaping of the prime materials which initially are usually provided so as to be planar or slab-shaped or rolled on reels.

Two-dimensional shaping here is understood to be the cutting-to-size of the outer contours of the material. This may be performed by cutting or punching. However, excess material, such as retaining lugs, by way of which the material is fixed in the cavity, may still remain here. This excess material is typically removed only after injection molding and curing, for example cut away or machined away.

Three-dimensional shaping here is understood to be the at least basic adaption to the final shape of the respective material in the finished shaped part; final adapting of the three-dimensional shape may then optionally be performed after placing the latter into the cavity, during injection molding, by way of the pressure emanating from the injected plastics material which urges the materials against the wall of the cavity and thereby shapes said materials. Three-dimensional shaping may be performed by forming or deep drawing or pressing, for example.

The advantages of the invention in particular lie therein that on account of this method, in particular of the previously mentioned step wherein the injected plastics material in the transition region urges the third part of the front side of the second decorative shell against the lateral bounding area of the first decorative shell, the spacing between the two decorative materials on the shaped-part front side as compared to the prior art described at the outset is small, under certain circumstances even disappears entirely or at least almost entirely, or without auxiliary means is at least no longer visually perceptible to the human eye and/or without auxiliary means is no longer haptically sensible to the human hand, respectively. By means of the method according to the invention it is thus possible for a shaped part which is visually and/or haptically appealing and in which in particular the transition between the two decorative materials on the shaped-part front side does not allow for any joint at all to be identifiable or at least almost no joint to be identifiable to be produced. Furthermore, the transition region between mutually adjacent decorative materials on the shaped-part front side is configured so as to be entirely or at least almost entirely planar and thus does not inevitably have to be smoothed by a lacquer layer or similar. Also, the lifespan of a shaped part which has been produced by the method according to the invention is extended, since on account of the absent or almost entirely absent joint a dirt trap by way of which the shaped part in the course of time may become unsightly is deleted, or at least the property of a dirt trap is reduced on account thereof.

During or after placing the first decorative shell and/or the second decorative shell into the opened cavity of the injection mold it may be provided that the first decorative shell and/or the second decorative shell are/is positionally fixed, for example by way of fixing pins in the mold which interact with holes in retaining lugs on the decorative shells. On account thereof, slippage of the decorative shells is prevented during closing of the tool or during injection of plastics material.

One refinement of the method provides that the first decorative material and/or the second decorative material prior to preshaping, or the first decorative shell and/or the second decorative shell prior to placing into the cavity, on the reverse side thereof which is not envisaged for configuring the visible face of the shaped part, and/or the first decorative material or the first decorative shell on the lateral bounding area thereof, are/is provided with an adhesive layer. An adhesive film may be laminated thereonto, or a primer may be applied as a lacquer, for example. On account thereof, the adhesion between the decorative material and the carrier as well as between the two decorative materials in the overlap region and/or in the transition region is improved in the shaped-part to be produced.

It may also be provided that the first decorative material and/or the second decorative material prior to preshaping, or the first decorative shell and/or the second decorative shell prior to placing into the cavity, on the front side thereof which is envisaged for configuring the visible face of the shaped part are/is fashioned and/or processed and/or lacquered, for example by embossing, grinding, etching, and/or printing.

After injection molding, curing, and demolding of the shaped part from the injection mold the application of a transparent and/or translucent lacquer layer on the shaped-part front side may also be provided as a further method step.

The methods described above may be optionally followed by further method steps for completing the shaped parts, for example mechanical and/or chemical processing of the visible-face surface, cutting-to-size of the shaped part, lacquering of a border area so as to prevent the ingress of moisture between the layers, lettering and attaching additional decorative elements and/or mounting parts.

The shaped part according to the invention comprises a decorative layer on a shaped-part front side which is configured as the visible face, and a carrier on a shaped-part reverse side. The shaped-part front side which is configured as the visible face is subdivided into at least two regions, a first region and a second region which is adjacent to the first region. The decorative layer comprises a first decorative material and a second decorative material, wherein the first decorative material and the second decorative material each have a front side and a reverse side.

In the first region of the shaped-part front side the front side of the first decorative material configures the visible face, and in the second region of the shaped-part front side a first part of the front side of the second decorative material configures the visible face. A second part of the front side of the second decorative material in an overlap region at least partially lays against the reverse side of the first decorative material. A third part of the front side of the second decorative material in a transition region lays against a lateral bounding area of the first decorative material, which interconnects the front side and the reverse side of the first decorative material.

The advantages of the shaped part according to the invention are derived from the advantages which have been described by means of the method.

The shaped part according to the invention may be a decorative part and/or a trim part for a vehicle interior, which are/is configured as a shaped part.

The shaped part according to the invention may be produced by the method according to the invention, which has been described above, for example.

One refinement of the shaped part provides that the spacing between the lateral bounding area of the first decorative material and the third part of the front side of the second decorative material on the shaped-part front side which is configured as the visible face is at most 0.5 mm, in particular at most 0.1 mm, preferably at most 0.05 mm, furthermore particularly at most 0.01 mm.

It may also be provided that a joint which is configured between the first decorative material and the second decorative material on the shaped-part front side shaped-part by the spacing between the lateral bounding area of the first decorative material and the third part of the front side of the second decorative material on the front side which is configured as the visible face without auxiliary means is no longer visually perceptible to the human eye and/or without auxiliary means is no longer haptically sensible to the human hand. In other words, in the case of the shaped part according to the invention no joint or at least almost no joint is identifiable or determinable at the transition between the two decorative materials on the shaped-part front side. Rather, the transitions between mutually adjacent decorative materials on the shaped-part front side may be configured so as to be completely or at least largely planar, such that the shaped-part front side does not inevitably have to be smoothed by a lacquer layer or similar.

According to one refinement, the first decorative material on the reverse side thereof may have an adhesive layer by way of which the first decorative material in the overlap region is connected to the second part of the front side of the second decorative material and otherwise to the carrier.

It may also be provided that the first decorative material on the lateral bounding area thereof has an adhesive layer by way of which the first decorative material is connected to the third part of the front side of the second decorative material.

According to one refinement, the second decorative material on the reverse side thereof has an adhesive layer by way of which the second decorative material is connected to the carrier. An adhesive film may be laminated thereonto, or a primer may be applied as a lacquer, for example.

It is also possible for the front side of the decorative materials, or for the shaped-part front side, respectively, to be fashioned and/or processed and/or lacquered, for example by embossing, grinding, etching, and/or printing.

It may be provided in the case of both the method according to the invention as well as in the shaped part according to the invention that the first decorative material has greater brittleness and/or lower ductility than the second decorative material.

It may be provided in the case of both the method according to the invention as well as in the shaped part according to the invention that the first decorative material has a greater thickness than the second decorative material. The first decorative material may have a thickness of at least 0.5 mm, and the second decorative material may have a thickness of at most 0.4 mm, for example.

Alternatively, it may be provided however that the first decorative material has a lesser thickness than the second decorative material. The first decorative material may have a thickness of at most 0.4 mm, and the second decorative material may have a thickness of at least 0.5 mm, for example.

Furthermore alternatively, it may also be provided that the first decorative material and the second decorative material have at least approximately identical thicknesses, allowing for a deviation of maximum 20%, preferably maximum 10%, from the larger thickness.

It may be provided the first decorative material is or comprises a metal layer, in particular an aluminum layer or a stainless-steel layer or a magnesium layer or a chromium layer, or is or comprises a wooden layer or a plastics material layer or a textile layer, and/or that the second decorative material is or comprises a metal layer, in particular an aluminum layer or a stainless-steel layer or a magnesium layer or a chromium layer, or is or comprises a wooden layer or a plastics material layer or a textile layer.

It may also be provided that the decorative layer and/or the decorative materials are/is formed from a composite material, in particular a multilayer composite material, which comprises a decorative layer. For example, the decorative layer here may be a wood veneer, a metal layer, a film or foil, preferably a plastics material film and/or a metal foil, and/or be a textile layer or a fabric, respectively. However, it is also possible for the decorative layer and/or the decorative materials to be a metal layer, a film or foil, preferably a plastics material film and/or metal foil, and/or a textile layer or a fabric, respectively. If and when a wood veneer is provided, the wood veneer on the reverse side thereof is typically provided with a non-woven layer for adding flexibility to the wood veneer. The wood veneer here may be a real wood veneer or else an artificial wood veneer.

Furthermore, the shaped-part front side may be covered with a transparent and/or translucent lacquer layer.

The carrier may have or configure one or a plurality of fastening elements for attaching the shaped part in particular to a vehicle interior. These fastening elements may be configured so as to be integral with the carrier; but they may also be additional elements which are anchored in the carrier, for example by way of insert injection-molding using the plastics material which injected for forming the carrier during the production of the shaped part.

BRIEF DESCRIPTION OF THE DRAWINGS

The invention will be explained in more detail, also in terms of further features and advantages, by means of the description of exemplary embodiments and with reference to the appended and schematic drawings in which:

FIG. 1 shows an exemplary embodiment of a shaped part according to the invention in a three-dimensional and sectional illustration;

FIG. 2 shows a detail of a section through an injection mold in the production according to the invention of an exemplary embodiment of a shaped part according to the invention, and FIG. 3 shows a detail of a section through an exemplary embodiment of a shaped part according to the invention.

Mutually corresponding parts and components are identified by identical reference signs in the figures.

DETAILED DESCRIPTION OF THE PREFERRED EMBODIMENTS

FIG. 1 schematically shows an exemplary embodiment of a shaped part 10 according to the invention, in a three-dimensional and sectional illustration. The shaped part 10 comprises a decorative layer 14 on a shaped-part front side 11 which is configured as the visible face, and a carrier 13 on a shaped-part reverse side 12 which is opposite the shaped-part front side 11. The shaped-part front side 11 which is configured as the visible face is subdivided into a first region 15 and a second region 16 which is adjacent to the first region 15, wherein the first region 15 is formed by a first decorative material 17 of the decorative layer 14, and the second region 16 is formed by a second decorative material 18 of the decorative layer 14.

A joint 29 between the first decorative material 17 and the second decorative material 18 on the shaped-part front side 11 can only be identified as a line in FIG. 1. This joint 29 is configured to be so narrow that the transition between the various and mutually adjacent decorative materials 17 and 18 may be identified, but the human eye cannot identify the joint 29 without any auxiliary means, and the human hand also can no longer sense the joint 29 without auxiliary means. To a human, the transition between the decorative materials 17 and 18 on the shaped-part front side 11 thus appears to be planar and without the joint 29.

FIG. 2 clarifies the production of the shaped part 10 which is shown in FIG. 1, or else of an alternative shaped part according to the invention. A detail of a section through an injection mold 24 in the production according to the invention of the shaped part 10 is shown.

FIG. 3 shows a detail of a section through an exemplary embodiment of a shaped part 10 according to the invention, for example of the shaped part 10 shown in FIG. 1. In this illustration the details of the shaped part 10 according to the invention at the transition between the first region 15 having the first decorative material 17 and the second region 16 having the second decorative material 18 is identifiable. The first decorative material 17 has a front side 19 and a reverse side 21; the second decorative material 18 has a front side 20 and a reverse side 22.

In the first region 15 of the shaped-part front side 11 the front side 19 of the first decorative material 17 configures the visible face of the shaped part 10. In the second region 16 of the shaped-part front side 11 a first part 20a of the front side 20 of the second decorative material 18 configures the visible face.

A second part 20b of the front side 20 of the second decorative material 18 in an overlap region 26 partially lays against the reverse side 21 of the first decorative material 17. A third part 20c of the front side 20 of the second decorative material 18 in a transition region 27 lays against a lateral bounding area 28 of the first decorative material 17, which interconnects the front side 19 and the reverse side 21 of the first decorative material 17.

The spacing of the lateral bounding area 28 of the first decorative material 17 from the third part 20c of the front side 20 of the second decorative material 18 on the shaped-part front side 11 which is configured as the visible face is so minor that said spacing is not identifiable in FIG. 3. The joint 29 which is configured by this spacing between the two decorative materials 17 and 18 on the shaped-part front side 11 is so narrow that said joint 29 is not visible to the human eye without auxiliary means, and is not sensible to the human hand without auxiliary means.

FIG. 2 clarifies how a shaped part having a transition between the two decorative materials 17 and 18, which has such a planar effect, can be produced. Part of a cavity 23 of the injection mold 24 can be identified. A first decorative shell 17a which has already been preshaped from the first decorative material 17 has been placed against a wall 25 of the cavity 23, specifically in such a manner that a front side 19 of the first decorative shell 17a, which is envisaged for configuring the visible face of the shaped part 10, lays against the wall. The reverse side of the first decorative shell 17a is identified using the reference sign 21.

Furthermore, a second decorative shell 18a which has already been preshaped from the second decorative material 18 has been placed into the cavity 23 of the injection mold 24 in such a manner that a first part 20a of a front side 20 of the second decorative shell 18a at least partially lays against the wall 25 of the cavity 23, that a second part 20b of the front side 20 of the second decorative shell 18a in an overlap region 26 at least partially lays against the reverse side 21 of the first decorative shell 17a, and that a third part 20c of the front side 20 of the second decorative shell 18a in a transition region 27 partially spans a lateral bounding area 28 of the first decorative shell 17a which interconnects the front side 19 and the reverse side 21 of the first decorative shell 17a. The reverse side of the second decorative shell 18a is identified using the reference sign 22.

FIG. 2 shows that the two decorative shells 17a and 18a, and thus the two decorative materials 17 and 18, are mutually spaced apart directly on the wall 25 of the cavity 23 and thus between them and adjacent to the wall 25 have a clearly identifiable joint. This spacing between the decorative materials 17 and 18 thus has to be reduced by way of further method steps in the production of this shaped part.

This takes place in that subsequently to the situation which is described above and illustrated in FIG. 2 the carrier 13 of the shaped part 10 is configured by injecting plastics material into the closed cavity 23. Hereby, the injected plastics material urges the front side 19 of the first decorative shell 17a and the first part 20a of the front side 20 of the second decorative shell 18a against the wall 25. Furthermore, the injected plastics material in the overlap region 26 urges the second part 20b of the front side 20 of the second decorative shell 18a against the reverse side 21 of the first decorative shell 17a. Moreover, the injected plastics material in the transition region 27 urges the third part 20c of the front side 20 of the second decorative shell 18a against the lateral bounding area 28 of the first decorative shell 17a.

Even in the case where this is not explicitly shown in the figures, according to one variant the first decorative material 17 and/or the second decorative material 18 prior to pre-shaping, or else the first decorative shell 17a and/or the second decorative shell 18a prior to placing into the cavity 23, on the reverse side 21 or 22 thereof, respectively, which is not envisaged for configuring the visible face of the shaped part 10, may have been provided with an adhesive layer. The lateral bounding area 28 of the first decorative material 17 or of the first decorative shell 17a may also have been provided with an adhesive layer.

In this case the first decorative material 17 of the shaped part 10 shown in the figures, on the reverse side 21 thereof, also has an adhesive layer by way of which the first decorative material 17 in the transition region 26 is connected to the second part 20b of the front side 20 of the second decorative material 18 and otherwise to the carrier 13. In such a case, the first decorative material 17 on the lateral bounding area 28 thereof optionally also has an adhesive layer by way of which the first decorative material 17 is connected to the third part 20c of the front side 20 of the second decorative material 18. Optionally, the second decorative material 18 on the reverse side 22 thereof also has an adhesive layer by way of which the second decorative material 18 is connected to the carrier 13.

In a further variant which is not identifiable in the figures, it may likewise be provided that the first decorative material 17 and/or the second decorative material 18 prior to pre-shaping, or else the first decorative shell 17a and/or the second decorative shell 18a prior to placing into the cavity 23, on the front side 19 or 20, respectively, which is envisaged for configuring the visible face of the shaped part 10 have been fashioned and/or processed and/or lacquered.

LIST OF REFERENCE SIGNS

10 Shaped part
11 Shaped-part front side
12 Shaped-part reverse side
13 Carrier
14 Decorative layer
15 First region of the shaped-part front side 11
16 Second region of the shaped-part front side 11
17 First decorative material
17a First decorative shell
18 Second decorative material
18a Second decorative shell
19 Front side of the first decorative material 17 or of the first decorative shell 17a, respectively 20 Front side of the second decorative material 18 or of the second decorative shell 18*a*, respectively
20*abc* First/second/third part of the front side 20
21 Reverse side of the first decorative material 17 or of the first decorative shell 17*a*, respectively
22 Reverse side of the second decorative material 18 or of the second decorative shell 18*a*, respectively
23 Cavity
24 Injection mold
25 Wall of the cavity 23
26 Overlap region
27 Transition region
28 Lateral bounding area of the first decorative shell 17 or of the first decorative material 17*a*, respectively
29 Joint between the first decorative material 17 and the second decorative material 18

We claim:

1. A method for producing a shaped part, in particular a decorative part and/or a trim part for a vehicle interior, which are/is configured as a shaped part, comprising a decorative layer on a shaped-part front side which is configured as a visible face, and a carrier on a shaped-part reverse side, wherein the shaped-part front side which is configured as the visible face is subdivided into at least two regions, a first region and a second region which is adjacent to the first region, wherein the decorative layer comprises a first decorative material and a second decorative material, wherein in the first region of the shaped-part front side the first decorative material configures the visible face, and in the second region of the shaped-part front side the second decorative material configures the visible face, the method comprising the following steps:

a) preshaping the first decorative material into a first decorative shell and the second decorative material into a second decorative shell, wherein the first decorative shell and the second decorative shell each have a front side for configuring the visible face of the shaped part and a reverse side;
   b) placing the first decorative shell into an opened cavity of an injection mold in such a manner that the front side of the first decorative shell at least partially lays against a first wall of the cavity;
   c) placing the second decorative shell in the opened cavity of the injection mold in such a manner,
   c1) that a first part of the front side of the second decorative shell at least partially lays against the first wall of the cavity,
   c2) that a second part of the front side of the second decorative shell in an overlap region at least partially lays against and makes contact with the reverse side of the first decorative shell; and
   c3) that a third part of the front side of the second decorative shell in a transition region at least partially spans a lateral bounding area of the first decorative shell which interconnects the front side and the reverse side of the first decorative shell;
   d) closing the cavity;
   e) configuring the carrier by injecting plastics material into the cavity,
   e1) wherein the injected plastics material urges the front side of the first decorative shell and the first part of the front side of the second decorative shell against the wall,
   e2) wherein the injected plastics material in the overlap region urges the second part of the front side of the second decorative shell against the reverse side of the first decorative shell; and
   e3) wherein the injected plastics material in the transition region urges the third part of the front side of the second decorative shell against the lateral bounding area of the first decorative shell so that a transition from the front side of the first decorative shell to the first part of the front side of the second decorative shell is smooth and planar.

2. The method as claimed in claim 1, wherein:
the first decorative material and/or the second decorative material prior to preshaping, or the first decorative shell and/or the second decorative shell prior to placing into the cavity, on the reverse side thereof which is not envisaged for configuring the visible face of the shaped part, and/or the first decorative material or the first decorative shell on the lateral bounding area thereof, are/is provided with an adhesive layer.

3. The method as claimed in claim 1, wherein:
the first decorative material and/or the second decorative material prior to preshaping, or the first decorative shell and/or the second decorative shell prior to placing into the cavity, on the front side thereof which is envisaged for configuring the visible face of the shaped part are/is fashioned and/or processed and/or lacquered.

4. The method as claimed in claim 1, wherein:
the first decorative material has greater brittleness and/or lower ductility than the second decorative material.

5. The method as claimed in claim 1, wherein:
the first decorative material has a greater thickness than the second decorative material, wherein the first decorative material has a thickness of at least 0.5 mm and the second decorative material has a thickness of at most 0.4 mm, or
in that the first decorative material has a lesser thickness than the second decorative material, wherein the first decorative material has a thickness of at most 0.4 mm and the second decorative material has a thickness of at least 0.5 mm.

6. The method as claimed in claim 1, wherein:
the first decorative material comprises at least one of an aluminum layer or a stainless-steel layer or a magnesium layer or a chromium layer or a wooden layer or a plastics material layer or a textile layer, and wherein the second decorative material comprises at least one of an aluminum layer or a stainless-steel layer or a magnesium layer or a chromium layer or a wooden layer or a plastics material layer or a textile layer.

* * * * *